United States Patent [19]

Lynch

[11] Patent Number: 4,502,288
[45] Date of Patent: Mar. 5, 1985

[54] MISTING CONTROL APPARATUS

[76] Inventor: Gary M. Lynch, M.S. 861, Fernvale, Queensland, 4305, Australia

[21] Appl. No.: 413,374

[22] Filed: Aug. 23, 1982

[30] Foreign Application Priority Data

Jan. 7, 1981 [AU] Australia ............................. PE7164

[51] Int. Cl.³ ............................ F28D 3/00; F24F 11/00
[52] U.S. Cl. .......................................... 62/171; 73/338; 236/44 B; 239/63
[58] Field of Search ............. 236/44 B, 44 E; 239/63, 239/64, 75; 73/338; 62/259.4, 176.4, 171; 165/20; 340/602

[56] References Cited

U.S. PATENT DOCUMENTS

| 1,430,853 | 10/1922 | Roesch | 73/338 X |
| 2,212,852 | 8/1940 | Bichowsky | 73/338 |
| 2,215,218 | 9/1940 | Harrison | 73/338 |
| 2,256,127 | 9/1941 | Smith | 73/338 |
| 2,785,007 | 3/1957 | Jensen | 239/64 |
| 3,874,590 | 4/1975 | Gibson | 239/63 |
| 4,197,991 | 4/1980 | D'Amato | 236/44 A |

FOREIGN PATENT DOCUMENTS

| 55-18269 | 2/1980 | Japan. | |
| 124919 | 9/1981 | Japan | 236/44 C |
| 197503 | 6/1975 | U.S.S.R. | 239/63 |

Primary Examiner—William E. Wayner
Attorney, Agent, or Firm—McAulay, Fields, Fisher, Goldstein & Nissen

[57] ABSTRACT

Apparatus (10) for applying mist or spray to an environment such as one in which plants (11) are growing including a monitoring head (12) arranged in the environment to sense the humidity therein by measurements of temperature and a control device (13) for actuating mist or spray heads (15) to apply mist or spray to the plants (11) in accordance with the humidity sensed by the monitoring head (12).

19 Claims, 2 Drawing Figures

U.S. Patent    Mar. 5, 1985    4,502,288

MISTING CONTROL APPARATUS

FIELD OF THE INVENTION

This invention relates to misting control apparatus and in particular to apparatus for controlling the application of mist or spray to a certain environment so as to maintain the humidity therein wherein a specific range. The apparatus of the present invention is particularly suitable for use in plant watering systems in nurseries and in particular for regulating water spraying as an element of mist propagation procedures relating to plants. The present invention, however, is also suitable for use in other environments where controlled moisture generation is required such as misting of green clay pots and the like to prevent drying out thereof prior to firing.

BACKGROUND OF THE INVENTION

There are presently a number of systems available for controlling the generation of mist in nurseries in particular for plant propogation. In one system time control is used wherein spraying devices are switched on and off under the control of timers so that spray or mist may be applied to the plants at set intervals. Such systems are normally pre-set according to the ambient conditions and thus if the ambient conditions change the timers have to be adjusted so as to compensate therefor. A second system employs a balance arm principle to control the generation of mist. Such a system depends upon the weight difference between a wet and dry piece of gauze or similar material and a counterweight situated at the opposite ends of a lever arm. As long as the gauze is wet the counterweight will hold the lever in balance. If the gauze dries up, for example, when the relative humidity falls, the weight of the gauze will be reduced thus causing the lever arm to tilt and activate a switch to turn on the spraying systems. The moisture absorbed by the gauze as a result of the turning on of the system will add to the gauze weight thereby gradually restoring the state of equilibrium which will cause switching off of the sprayers. The disadvantage of this system, however, is that the state of equilibrium is very fragile and easily unbalanced by vibration—or air currents. Furthermore, a salt or algae buildup on the gauze will change the weight distribution of the system necessitating frequent cleaning or recalibration.

A further moisture control system is an artificial leaf sensor control which depends on electric currents conducted by water on an artificial leaf-like surface. If water is present between two probes on the surface the current will flow whilst the absence of a current will indicate a dry surface which absence can be used as a signal to activate the spraying equipment. Unfortunately, salts contained in water which transform the non-conductive water into a conductive liquid remain on the surface after the water itself has evaporated. When the water dries up some salt deposits are always left and they allow the current to flow even in the absence of water, thus rendering the control system unreliable. Furthermore, a buildup of grease on the surface will prevent a water film from being formed between the probes. The above shortcomings necessitate frequent cleaning to avoid malfunctions.

OBJECTS AND SUMMARY OF THE INVENTION

The present invention aims to overcome the above disadvantages by providing apparatus for controlling the application of mist or spray to an environment by the use of temperature measurements and based on the directly proportional relationship between degree of moisture and evaporation heat losses. The present invention eliminates the undesirable features of the prior art arrangements and provides a stable, reliable and efficient means whereby humidity in an environment may be controlled. Other objects and advantages of the invention will become apparent from the following description.

With the above and other objects in view this invention resides broadly in apparatus for controlling the application of mist or spray to an environment, said apparatus including a monitoring head, said monitoring head being adapted to be disposed within said environment and including first and second temperature sensitive elements, said first element being adapted to be exposed to said mist or spray and ambient conditions, and said second element being adapted to sense the wet bulb temperature of said environment, and means responsive to the temperature difference measured between said first and second elements to control the application of said mist or spray to said environment.

BRIEF DESCRIPTION OF THE DRAWING

In order that the invention may be more readily understood and put into practical effect, reference will now be made to the accompanying drawings which illustrate a preferred embodiment of the invention and wherein:

FIG. 1 is a schematic diagram illustrating apparatus according to the present invention for controlling mist or spray application to plants in a nursery or the like.

DISCLOSURE OF BEST MODE

Figure 1:
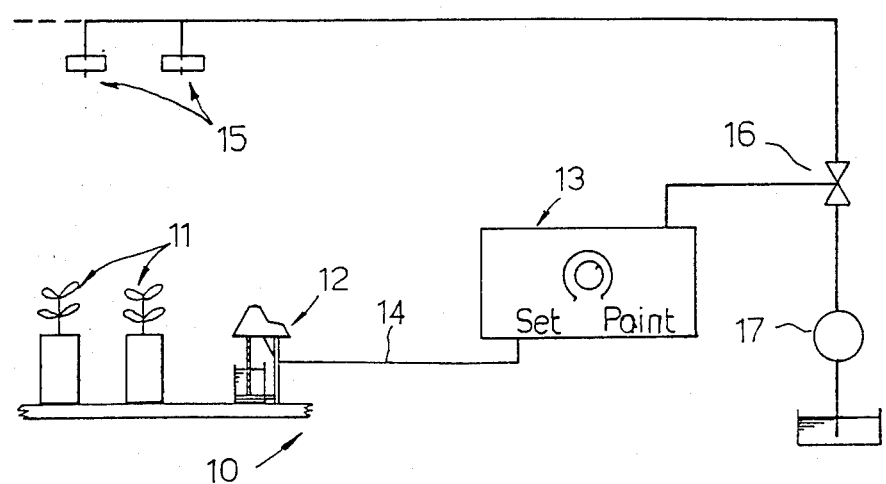

Referring to FIG. 1 there is illustrated apparatus 10 according to the present invention which is particularly suitable for controlling the application of mist or spray to plants 11 in a nursery or the like for plant propagation purposes. The apparatus 10 includes a monitoring head 12 which is adapted to be disposed adjacent to the plants 11 and to act as a humidity sensor for the environment surrounding the plants. A controller 13 is interconnected with the monitoring head 12 via shielded cables 14 and is arranged to control the application of liquid mist or spray from a plurality of spray heads 15 disposed above the plants. For this purpose a solenoid valve 16 is provided which communicates with a liquid pump 17 and the operation of the solenoid valve 16 is controlled by the controller 13 so that liquid may be applied to the spray heads 15 from the pump 17.

Figure 2:
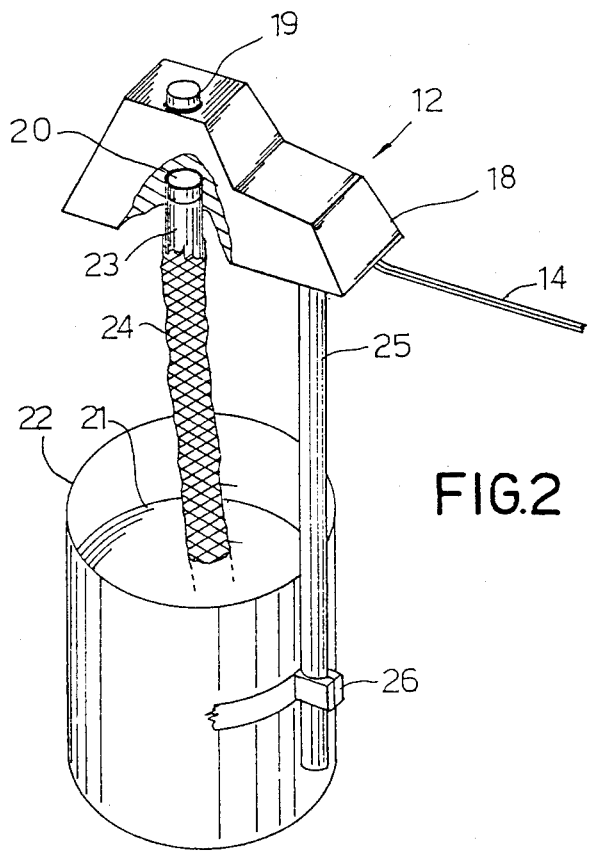
FIG. 2 is a partly cut away perspective view of a monitoring head for use in the apparatus illustrated in FIG. 1.

As more clearly illustrated in FIG. 2, the monitoring head 12 includes a housing 18 constructed of plastics material such as epoxy resin or like material which partly encapsulates a first temperature sensitive element 19 in this case a thermistor which is disposed in an upper portion of the housing and exposed to mist or spray falling on the housing 18 so as to act as a working or sensing probe. The element 19 is also exposed to ambient conditions of temperature and humidity and also to any natural moisture deposition, for example, rainfall or dew.

A second temperature sensitive element 20 also preferably a thermistor, is encapsulated within the housing 18 and communicates with liquid 21 in a container 22 or the like. Preferably, a metal sleeve 23 surrounds the thermistor 20 to be in temperature transmitting contact therewith and extends outwardly of the housing 18 to enable a wick 24 of textile material to be fixed thereto and extend into the liquid 21 in the container 22. Alternatively, the sleeve 23 may be eliminated and the wick attached directly to the element 20. Preferably, the sides of the housing 18 diverge outwardly and downwardly and the respective side surfaces are roughened so that liquid deposited thereon is retained so that the whole housing is subject to an evaporative cooling effect. Preferably, also, the monitoring head housing 18 is supported to the container 22 by means of an upstanding support rod 25 and a clip 26 which clamps on to the container 22. Of course, many other suitable arrangements may be used for supporting the housing 18 so that the wick 24 extends into the liquid in the container. Liquid is normally maintained in the container by the mist or spray emitted by the heads 15. However, if required an automatic refilling pipe incorporating a ball valve or similar suitable device may extend from the pump 17 to the container 26 to maintain sufficient liquid therein.

Thus, it can be seen that either the metal sleeve 23 or the element 20 are maintained in a constantly wet condition by virtue of the capillary action of the wick 24. The evaporative cooling effect of the liquid will maintain the element 20 at a relatively low temperature in accordance with the humidity of the environment so that the element will sense the wet bulb temperature of the environment.

In this respect, the monitoring head 12 of the apparatus may be compared with a conventional humidity measuring device wherein one thermometer is maintained constantly wet whilst the other is dry. In such a conventional device the temperature of the wet thermometer will generally be less than the temperature of the dry thermometer as evaporation will cool it down. The magnitude of the temperature difference is an indication of the humidity—the dryer the atmosphere, the greater the evaporation and the bigger the temperature differentiation. In the monitoring head of the present invention, however, the element 20 is maintained at the wet bulb temperature all the time whilst the element 19 is also wet most of the time. If the element 19 is wet, it will be forced to the wet bulb temperature sensed by the element 20 due to evaporation and there will be no differential between the temperature sensed between the upper and lower elements. However, as the element 19 dries off, its temperature will start to rise towards the dry bulb temperature of the environment and a temperature differential will exist indicating a decrease in humidity which differential may be used to switch on the misting sprays 15 or the like, so as to increase the humidity. Thus the humidity in the environment being controlled will cycle between 100 percent and the humidity corresponding to the temperature differential at which the misters switch on.

Although the relationship between temperature differential and humidity is non linear, the relationship becomes more linear the closer 100 percent relative humidity is approached. In a mist propogation room, the benches on which the plants are located are usually heated and the dry bulb temperature rarely falls below 15° C. Furthermore, in such circumstances, a very moist atmosphere i.e. in the region of 90 percent relative humidity is required. Under these conditions, the error introduced by relating a fixed differential to a constant humidity over the full dry bulb range is relatively low and particularly where the temperature range is relatively narrow. Furthermore such errors caused by non linearity can be electronically calibrated out of the system.

In plant propagation use, the sensing head 12 is placed close to the plants 11 to be watered and in a position which will ensure that the upper elements 19 will receive a proportional quantity of water dispensed to the plants 11 from the misters or spray heads 15.

The temperature sensed by the elements 20 will vary only in line with ambient conditions of temperature and humidity in the micro-climate around the plants whilst the temperature measured at the element 19 will not only depend on ambient conditions but also on the quantity of residual water left on the probe after a spray or misting cycle. If no water is deposited onto the element 19 by either the misters or natural rain or dew, evaporation will lead to a gradual drying up of the element surface. As long as such evaporation occurs the relevant heat loss will keep the element surface at a lower temperature than a dry surface under the same ambient conditions. Once evaporation stops so that the element 19 is substantially dry, the element 19 will heat up so that a marked difference in temperature will occur between the dry element 19 and the constantly wet reference element 20. This temperature difference will be sensed by the controller 13 so that the misters 15 may be operated to re-apply water to the plants and consequently the element 19. The apparatus thus controls the micro-climate adjacent the plants 11 irrespective of outside influences.

The controller 13 preferably includes a pair of comparators, the first comparator comparing the temperature sensed at each element 19 and 20 and the second comparator comparing the difference in temperature with a set reference point. If the differential exceeds the reference point, the controller 13 will cause the solenoid valve 16 to switch on to apply liquid from the pump 17 to the misters 15. The set point may be varied by the user such as to alter the temperature differential reference point and the switch-on time of the misting heads 14, for example if higher or lower humidity in the micro-climate is required. After the misters 15 are switched on, they will switch off as soon as the temperature differential falls below the set point. The cycle will then repeat with the misters being turned on and off for short times regularly to maintain the humidity within the desired range as selected by the user. The rate of evaporation governs the time delay between mist applications by the heads 15.

In an alternative construction of monitoring head, the liquid container 22 may be eliminated and the element 20 disposed within a moisture retaining housing. Such a housing would then receive moisture from the misting heads 15 so that the element 20 would always sense the wet bulb temperature. Such a housing could also be topped up with liquid if desired.

The advantage of the apparatus described above is that temperature information can be translated into substantially proportional moisture degree data, and if ambient conditions change they are superimposed onto both readings of both elements 19 and 20 thereby reflecting the true conditions on the leaf surfaces of surrounding plants. Vibrations, salt deposits and grease deposits will have no detrimental effect because the surfaces of both elements are exposed to the same influences, whilst the electric conductors conveying information gathered at the probes are shielded, thereby eliminating electrical or electronic misinterpretation. It will further be seen that the apparatus of the present invention standardizes misting procedure irrespective of ambient conditions. From FIG. 1, it will be clear that the apparatus controls the micro-climate around the plants by sensing the actual conditions therein irrespective of conditions outside of the micro-climate.

The moisture control apparatus and monitoring head may be utilised in a wide range of applications such as for monitoring of root moisture as well as surface moisture and also as previously referred to as a control system for the control of spraying in other situations, e.g. for maintaining the moisture in green clay pots prior to firing, or for curing of concrete products. In such a latter case, a porous plug of the same material as the products to be maintained moist may be placed on the upper sensing element 19. Such a plug will dry at the same rate as the product and thus ensure that the optimum moisture is applied to the products during curing or prior to firing.

Of course, different signals generated by the elements 19 and 20 can be transmitted to a central irrigation control station, if required, and furthermore, the sensing head can supply valuable data even when the misters are not in use. Furthermore, fail-safe circuits can be incorporated to provide acoustic or optic signals to standby personnel even over long distances.

Whilst the above has been given by way of illustrative example it will be realised that many modifications and variations may be made to the above described embodiment by persons skilled in the art without departing from the broad scope and ambit of the invention as defined by the appended claims.

I claim:

1. Apparatus for controlling the application of mist or spray to an environment, said apparatus including:
   a monitoring head, said monitoring head being disposed within said environment and including a housing;
   a first temperature sensitive element disposed in an upper portion of said housing and being exposed to ambient conditions and mist or spray applied to said environment;
   a second temperature sensitive element disposed in a lower portion of said housing and being maintained at the web bulb temperature of said environment;
   means associated with said elements for measuring the difference in temperature sensed by said first and second temperature sensitive elements; and
   means responsive to said measured temperature difference for controlling the application of said mist or spray to said environment.

2. Apparatus according to claim 1, wherein said second element communicates with liquid in a reservoir via capillary means whereby to be maintained in a constantly wet condition and subject to evaporative cooling so as to sense said wet bulb temperature.

3. Apparatus according to claim 2, wherein said second element is surrounded by and in close temperature transmitting contact with a metallic sleeve, said sleeve communicating with liquid in a reservoir via capillary means to be thus maintained in a constantly wet condition and subject to evaporative cooling whereby said second element may sense said wet bulb temperature.

4. Apparatus according to claim 3, wherein said capillary means comprises a wick.

5. Apparatus according to claim 1, wherein said second element is surrounded by and in close temperature transmitting contact with a metallic sleeve, said sleeve communicating with liquid in a reservoir via capillary means to be thus maintained in a constantly wet condition and subject to evaporative cooling whereby said second element may sense said wet bulb temperature.

6. Apparatus according to claim 5, wherein said capillary means comprises a wick.

7. Apparatus according to claim 1, wherein the sides of said monitoring head housing diverge outwardly and downwardly.

8. Apparatus according to claim 7, wherein said housing is molded of plastics material and wherein said elements are at least partially encapsulated therein.

9. Apparatus according to claim 8, further including solenoid valve means to supply liquid to misting or spray heads whereby to apply mist or spray to said environment.

10. Apparatus according to claim 1, further including solenoid valve means to supply liquid to misting or spray heads whereby to apply mist or spray to said environment.

11. A method of controlling humidity range in an environment by regulating the application of mist or spray thereto, said method comprising:
   sensing the temperature in the environment with a first temperature sensitive element disposed in an upper portion of a housing exposed to ambient conditions and the mist or spray applied to the environment;
   sensing the wet bulb temperature with a second temperature sensitive element disposed in a lower portion of the housing and maintained at the wet bulb temperature of the environment; and
   applying the mist or spray to the environment when the first point is dry and at a selected difference in temperature sensed by the first and second temperature sensitive elements above the wet bulb temperature until the temperature at the first point falls below the selected temperatures.

12. A method according to claim 11 wherein said humidity range is controlled in the micro-climate adjacent plants in a plant nursery and wherein said mist or spray is applied to said plants in accordance with the conditions within said micro-climate.

13. Apparatus for controlling humidity in the micro-climate about plant cuttings to be propagated, comprising:
   mist or spray heads for applying water mist or spray to said micro-climate;
   a monitoring head disposed adjacent said plant cuttings for monitoring humidity conditions in said micro-climate;
   said monitoring head including a housing, a first temperature sensitive element disposed in the upper portion of said housing and being exposed to ambient conditions and to water mist or spray applied by said mist or spray heads;
   a second temperature sensitive element disposed in the lower portion of said housing and being maintained at the wet bulb temperature of said micro-climate;

means associated with said elements for measuring the difference in temperatures sensed by said elements; and regulating means responsive to the resulting measured temperature difference for regulating the application of water mist or spray from said mist or spray heads;

said regulating means being operative to turn on said mist or spray heads to apply water mist or spray to said plant cuttings when said measured temperature difference increases above a predetermined level as a result of a humidity drop in said microclimate sensed by the temperature rise of said first element; and said regulating means being further operative to turn off said mist or spray heads when said temperature difference is reduced below said predetermined level due to temperature fall of said first element as a result of the cooling effect of said applied water mist or spray from said mist or spray heads.

14. Apparatus according to claim 13, wherein said second element communicates with liquid in a reservoir via capillary means whereby to be maintained in a constantly wet condition and subject to evaporation cooling so as to sense said wet bulb temperature.

15. Apparatus according to claim 13, wherein said second element is surrounded by and in close temperature transmitting contact with a metallic sleeve, said sleeve communicating with liquid in a reservoir via capillary means to be thus maintained in a constantly wet condition and subject to evaporative cooling whereby said second element may sense said wet bulb temperature.

16. Apparatus according to claim 13, wherein said capillary means comprises a wick.

17. Apparatus according to claim 13, wherein the sides of said monitoring head housing diverge outwardly and downwardly.

18. Apparatus according to claim 13, wherein said housing is molded of plastics material and wherein said elements are at least partially encapsulated therein.

19. Apparatus according to claim 13, further including solenoid valve means to supply liquid to misting or spray heads whereby to apply mist or spray to said environment.

* * * * *